United States Patent
Yukawa

(10) Patent No.: US 10,226,970 B2
(45) Date of Patent: Mar. 12, 2019

(54) SOUND-SUPPRESSOR-EQUIPPED PNEUMATIC TIRE, AND SOUND SUPPRESSOR FOR TIRES

(71) Applicant: SUMITOMO RUBBER INDUSTRIES, LTD., Kobe-shi, Hyogo (JP)

(72) Inventor: Naoki Yukawa, Kobe (JP)

(73) Assignee: Sumitomo Rubber Industries, Ltd., Kobe-shi, Hyogo (JP)

(*) Notice: Subject to any disclaimer, the term of this patent is extended or adjusted under 35 U.S.C. 154(b) by 114 days.

(21) Appl. No.: 15/112,068

(22) PCT Filed: Aug. 1, 2014

(86) PCT No.: PCT/JP2014/070369
§ 371 (c)(1),
(2) Date: Jul. 15, 2016

(87) PCT Pub. No.: WO2015/118707
PCT Pub. Date: Aug. 13, 2015

(65) Prior Publication Data
US 2016/0339749 A1    Nov. 24, 2016

(30) Foreign Application Priority Data
Feb. 7, 2014   (JP) ................... 2014-022579

(51) Int. Cl.
*B60C 19/00* (2006.01)
(52) U.S. Cl.
CPC ................. *B60C 19/002* (2013.01)

(58) Field of Classification Search
CPC .................................................. B60C 19/002
See application file for complete search history.

(56) References Cited

U.S. PATENT DOCUMENTS

2006/0231185 A1    10/2006  Tanno
2009/0277549 A1*   11/2009  Tanno ............... B60C 19/002
                                                   152/157

(Continued)

FOREIGN PATENT DOCUMENTS

JP    2003-48407 A    2/2003
JP    2006-182280 A   7/2006

(Continued)

OTHER PUBLICATIONS

Extended European Search Report dated Jul. 17, 2017, for European Application No. 14881985.7.

(Continued)

*Primary Examiner* — Robert C Dye
(74) *Attorney, Agent, or Firm* — Birch, Stewart, Kolasch & Birch LLP

(57) ABSTRACT

The purpose of the present invention is to inhibit deterioration in the external appearance of a sound suppressor, even when used in cold areas. This sound-suppressor-equipped pneumatic tire includes: a pneumatic tire provided with a tread section; and a sponge-like sound suppressor which is affixed to a tire inner cavity-side surface of the tread section, and which extends in the peripheral direction of the tire. In the sound suppressor, a plurality of slits are formed in an exposed surface which faces the tire inner cavity.

16 Claims, 5 Drawing Sheets

(56) References Cited

U.S. PATENT DOCUMENTS

2011/0308704 A1  12/2011  Sandstrom et al.
2014/0020806 A1   1/2014  Greverie et al.

FOREIGN PATENT DOCUMENTS

| JP | 2006-341629 A | 12/2006 |
| JP | 2007-112395 A | 5/2007 |
| JP | 2008-254339 A | 10/2008 |
| JP | 2009-292462 A | 12/2009 |
| JP | 2010-89683 A | 4/2010 |
| JP | 2012-989 A | 1/2012 |
| WO | WO 2005/012007 A1 | 2/2005 |
| WO | WO 2012/091065 A1 | 7/2012 |

OTHER PUBLICATIONS

International Search Report issued in PCT/JP2014/070369, dated Oct. 28, 2014.
Written Opinion of the International Searching Authoriy issued in PCT/JP2014/070369, dated Oct. 28, 2014.

* cited by examiner

SOUND-SUPPRESSOR-EQUIPPED PNEUMATIC TIRE, AND SOUND SUPPRESSOR FOR TIRES

TECHNICAL FIELD

The present invention relates to a pneumatic tire with a noise damper and a noise damper for a tire, and in particular, relates to a pneumatic tire in which deterioration in the appearance of a noise damper is prevented.

BACKGROUND ART

Conventionally, a pneumatic tire with a sponge-like noise damper attached to a surface on the side of a tire cavity of the tread portion is well known in order to reduce road noise of tires.

When the above pneumatic tire is used in cold climates, moisture in the air in the tire cavity may freeze and expand in the noise damper. This phenomenon causes a large number of cracks on the noise damper and brings a problem that aggravates its appearance.

CITATION LIST

Patent Literature

Patent literature 1: Japanese Unexamined Patent Application Publication No. 2007-112395

SUMMARY OF INVENTION

Technical Problem

The present invention has been made in view of circumstances as described above, and has a major object to provide a pneumatic tire with a noise damper and a noise damper for a tire capable of preventing deterioration in appearance of the noise damper, even when used in cold climates, by basically improving an exposed surface of the noise damper.

Solution to Problem

The present invention provides a pneumatic tire with a noise damper including a pneumatic tire having a tread portion, a circumferentially extending sponge-like noise damper being fixed to a surface on a side of a tire cavity of the tread portion, and the noise damper being provided with a plurality of slits on an exposed surface of the tire cavity.

In the pneumatic with a noise damper according to the present invention, preferably, the slits have a depth in a range of less than 50% of a thickness of the noise damper.

In the pneumatic with a noise damper according to the present invention, preferably, the depth is in a range of from 2 to 5 mm.

In the pneumatic with a noise damper according to the present invention, preferably, the slits are arranged at pitches of from 2 to 10 mm in a circumferential direction of the tire.

In the pneumatic with a noise damper according to the present invention, preferably, the slits are inclined at an angle of less than 20 degrees with respect to an axial direction of the tire.

In the pneumatic with a noise damper according to the present invention, preferably, the slits include a first slit and a second slit extending in a direction intersecting with the first slit.

In the pneumatic with a noise damper according to the present invention, preferably, the first slit intersects with the second slit.

Furthermore, the present invention provides a belt-like and sponge-like noise damper for a tire to be fixed to a surface on a side of a tire cavity of a tread portion of a pneumatic tire along a circumferential direction, the noise damper including a mounting surface for the tread portion and an exposed surface located in an opposite side of the mounting surface, and the exposed surface being provided with a plurality of slits.

In the noise damper for a tire according to the present invention, preferably, the slits have a depth in a range of less than 50% of a thickness of the noise damper.

In the noise damper for a tire according to the present invention, preferably, the depth is in a range of from 2 to 5 mm.

In the noise damper for a tire according to the present invention, preferably, the slits are arranged at pitches of from 2 to 10 mm in a circumferential direction of the tire.

In the noise damper for a tire according to the present invention, preferably, the slits are inclined at an angle of less than 20 degrees with respect to an axial direction of the tire.

In the noise damper for a tire according to the present invention, preferably, the slits include a first slit and a second slit extending in a direction intersecting with the first slit.

In the noise damper for a tire according to the present invention, preferably, the first slit intersects with the second slit.

Advantageous Effects of Invention

The pneumatic tire with a noise damper according to the present invention includes a circumferentially extending sponge-like noise damper fixed to the tread portion on the side of the tire cavity. The noise damper is provided with a plurality of slits on an exposed surface of the tire cavity. Since the slits can open or close by themselves so as to follow expansion deformation of the noise damper based on freezing the moisture in the noise damper in cold climates for example, cracks on the noise damper can be prevented. Furthermore, even when a crack occurs on the noise damper, the slits can make the crack inconspicuous. Therefore, the pneumatic tire with a noise damper according to the present invention can prevent deterioration in the appearance of the noise damper.

DESCRIPTION OF EMBODIMENTS

Figure 1:
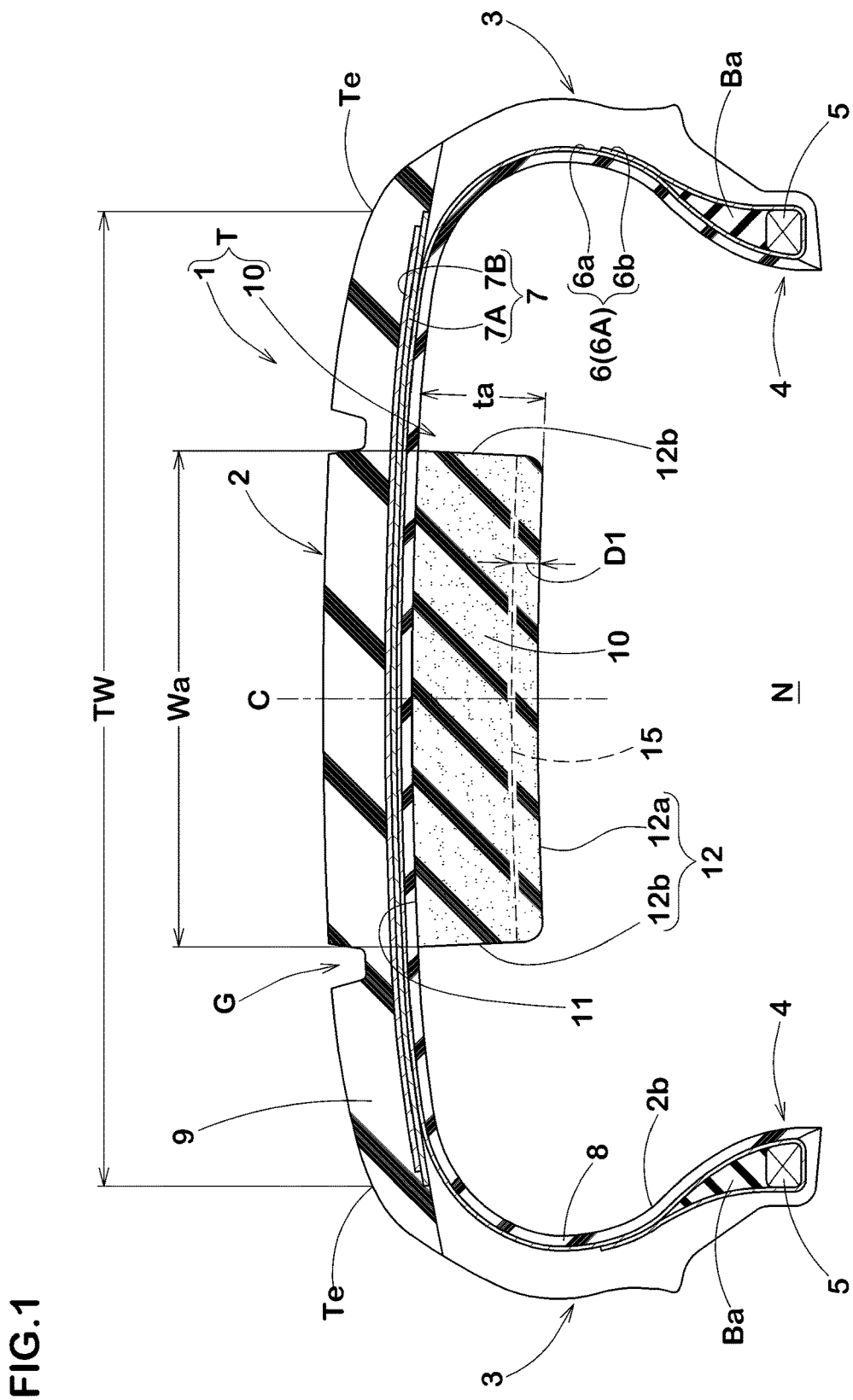
FIG. 1 is a cross-sectional view illustrating a pneumatic tire with a noise damper in accordance with an embodiment of the present invention.

Hereinafter, an embodiment of the present invention will be explained based on the drawings. FIG. 1 illustrates a cross-sectional view including a tire axis of a pneumatic tire with a noise damper T placed in a standard state in accordance with an embodiment of the present invention. As illustrated in FIG. 1, the pneumatic tire with a noise damper T according to the embodiment is suitably used as a passenger car tire, for example.

Here, the standard state is such that the tire is mounted on a standard wheel rim (not illustrated) with a standard pressure, and is loaded with no tire load. As used herein, unless otherwise noted, a dimension of each portion of the tire refers a value measured under the standard state.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example. Furthermore, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of a passenger car tire, however, the standard pressure is defined as 180 kPa.

The pneumatic tire with a noise damper T includes a pneumatic tire (hereinafter simply referred to as "tire") 1 having a toroidal shape and a circumferentially extending noise damper 10 fixed to a surface 2b of tire 1 on the side of a tire cavity N.

The tire 1 is configured as a tubeless tire, and includes a tread portion 2, a pair of sidewall portions 3 each extending radially inwardly from each end of the tread portion, and bead portions 4 each provided with a radially inner side of each sidewall portions 3 and each having a bead core 5 therein.

The tread portion 2 includes a belt layer 7 and a tread rubber 9 disposed radially outward of the belt layer 7. The tread rubber 9 comes into contact with the ground and is provided with a groove G for draining.

The tire 1 in accordance with the present embodiment includes a carcass 6, the belt layer 8 and an inner liner layer 8.

The carcass 6 is configured as at least one, one in this embodiment, carcass ply 6A. The carcass ply 6A includes a main portion 6a and turn-up portions 6b. The main portion 6a, for example, extends from the tread portion 2 to the bead cores 5 of the bead portions 4 through the sidewall portions 3. The turn-up portions 6b are continued to the main portion 6a, and are wound up around the bead cores 5 from the axially inside to the outside of the tire.

The carcass ply 6A is configured as a cord ply that includes carcass cords covered with a topping rubber. The carcass cords are oriented at an angle of from 70 to 90 degrees with respect to the tire equator C, for example. Preferably, an organic fiber cord such as rayon, nylon, polyethylene naphthalate (PEN), aramid and the like may be used for the carcass cords.

A bead apex rubber Ba that extends radially outwardly from the bead core 5 and is made of a hard rubber is disposed between the main portion 6a and one of the turn-up portions 6b of the carcass ply 6A in each bead portion.

The belt layer 7 includes at least one belt ply, two belt plies 7A and 7B in this embodiment, having a belt cord oriented at an angle of from 5 to 45 degrees with respect to the tire equator C, for example. For the belt cord, a steel cord is preferably employed, for example.

The inner liner layer 8 is disposed radially inward of the inner carcass ply 6A. In this embodiment, the inner liner layer 8 extends continuously between the pair of bead portions 4 and 4. The inner liner layer 8 is made of a rubber with air impermeable property to prevent air leakage from the tire cavity N. In this embodiment, the inner liner layer 8 forms the surface 2b of tire 1 on the side of a tire cavity N.

The noise damper 10, for example, is made of a spongy material of porousness with very small holes at its inside and surfaces. The spongy material, for example, is made of rubber or synthetic resin each having an open-cell or closed-cell structure. In the noise damper 10 according to the embodiment, a polyurethane sponge with an open-cell structure is employed. The porous noise damper 10 can absorb vibration energy of the air in the tire cavity N, and thus reduce road noise by preventing cavity resonance.

Figure 2:
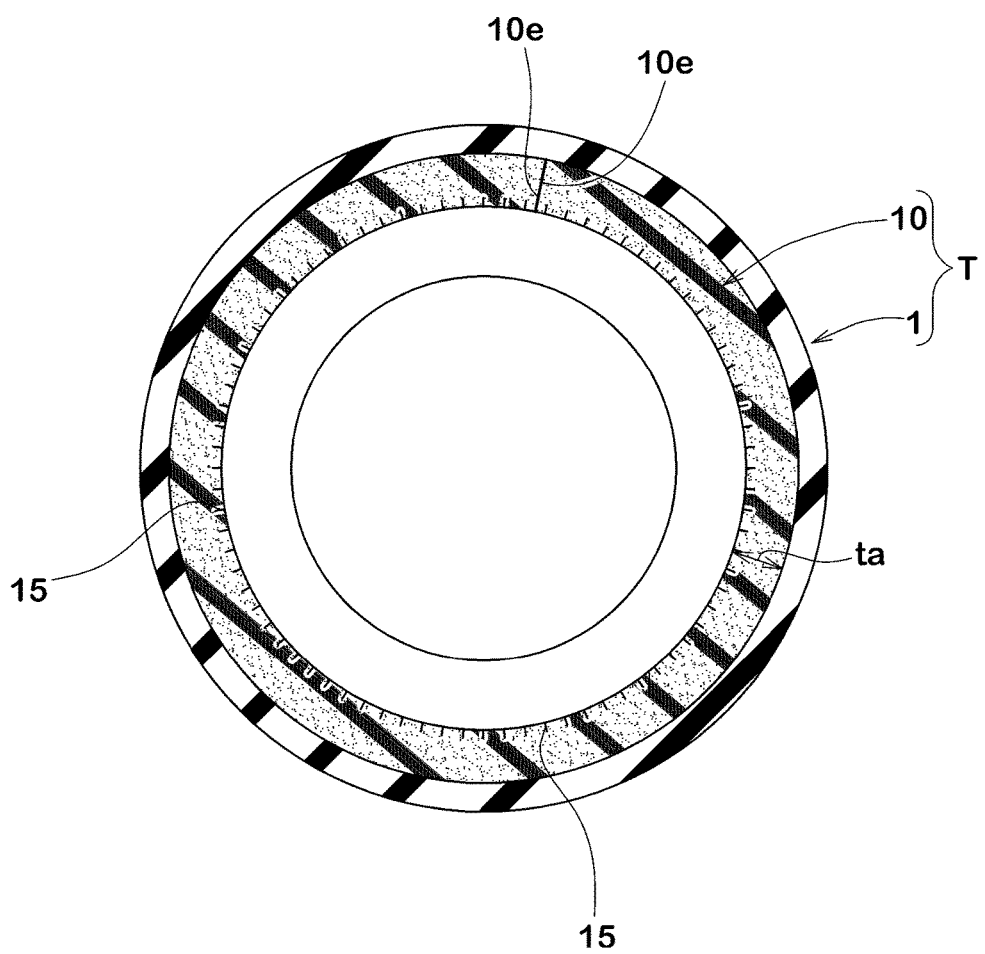
FIG. 2 is a circumferential cross-sectional view of the pneumatic tire with a noise damper of FIG. 1.

FIG. 2 illustrates a circumferential cross-sectional view of the pneumatic tire with a noise damper T. As illustrated in FIG. 2, the noise damper 10 according to the present embodiment is configured as a long belt shaped body, and then is formed in an annular shape along the circumferential direction of the tire. In FIG. 2, both ends 10e and 10e of the noise damper 10 are butt-jointed. Alternatively, the both ends 10e and 10e may be apart from one another. The noise damper 10 can reduce the road noise effectively over the circumferential direction of the tire.

As illustrated in FIG. 1, the noise damper 10, in the cross-sectional view of the tire, has a flat rectangular shape having an axial width Wa greater than a thickness (ta) in the radial direction of the tire. Such a noise damper 10 can prevent cracks that are caused by vibration or rolling of the tire 1 since the noise damper 10 ensures high rigidity. In order to further improve the effects, the thickness (ta) of the noise damper 10 is preferably in a range of from 0.1 to 0.5 times of the width Wa.

The cross sectional shape of the noise damper 10 is not limited to a rectangular shape, but may be employed a trapezoidal shape, triangular shape and bullet shape, semicircular shape and the like, for example. Preferably, the cross sectional shape of the noise damper 10 is configured as symmetrical with respect to the radial line that passes the axially center position of the noise damper. In this embodiment, the noise damper 10 is arranged so that the axial center position is located on the tire equator C.

It is not particularly limited, but an axial width Wa of the noise damper 10 is preferably in a range of from 30% to 70% of the tread width TW in order to reduce road noise effectively. The thickness (ta) of the noise damper 10 is preferably in a range of from 5 to 50 mm.

The tread width TW is defined as an axial distance between the tread edges which are axially outermost edges of the ground contact patch that occurs when the tire under the standard state is loaded with a standard tire load at a camber angle of zero. The standard tire load is a tire load officially approved for the tire by standards organizations on which the tire is based, wherein the standard load is the "maximum load capacity" in JATMA, the "Load Capacity" in ETRTO, and the maximum value given in the above-mentioned table in TRA or the like.

In this embodiment, the noise damper 10 includes a mounting surface 11 to be fixed to the surface 2b on the side of the tire cavity N of the tread portion 2 and an exposed surface 12 located in an opposite side of the mounting surface 11. That is, the exposed surface 12 faces the tire cavity N.

In this embodiment, the exposed surface 12 includes an axial surface 12a extending in the axial direction of the tire and a pair of side surfaces 12b and 12b each extending in the radial direction to connect the axial surface 12a with the mounting surface 11.

Figure 3:
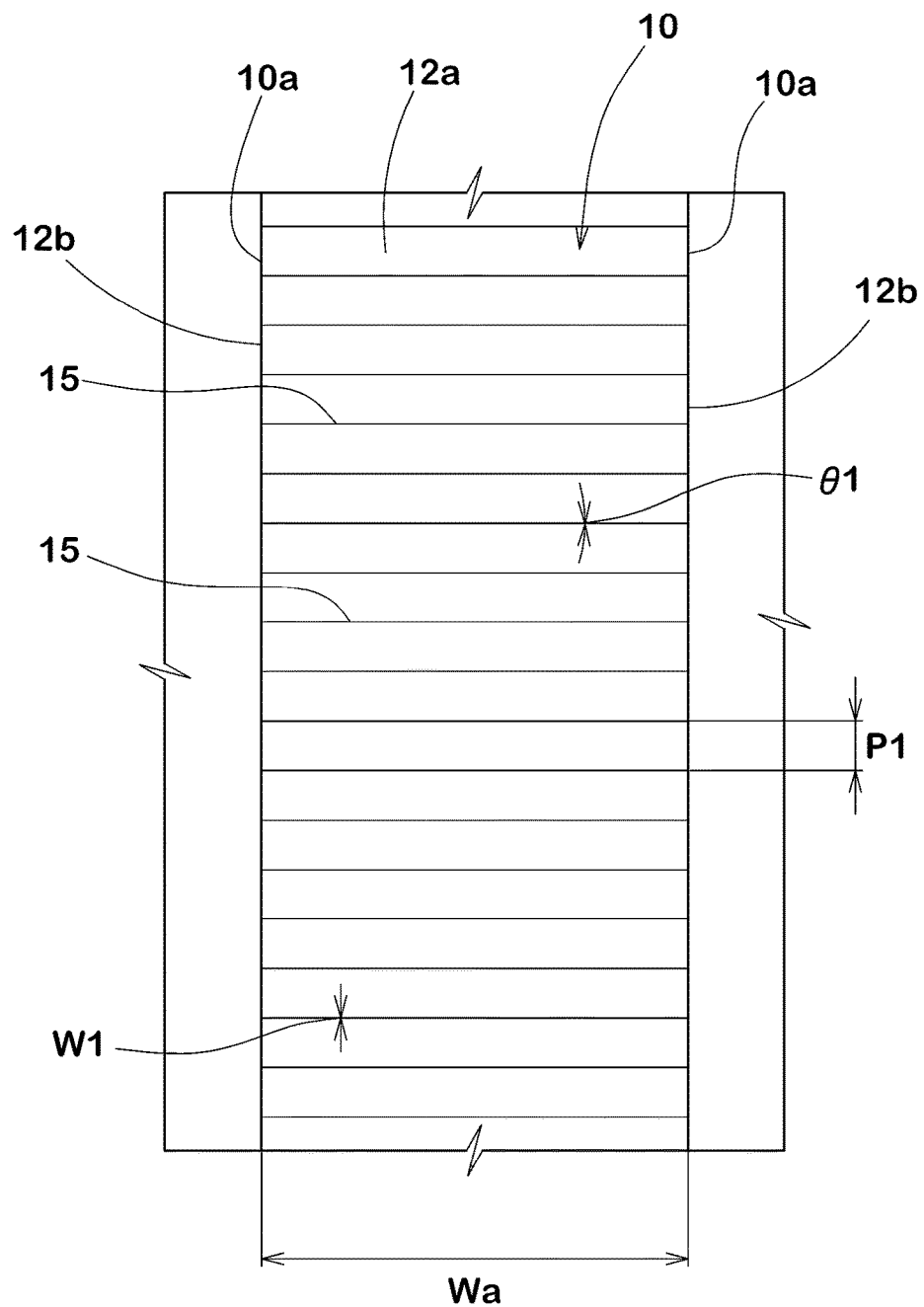
FIG. 3 is a plan view illustrating the noise damper in accordance with the present embodiment.

FIG. 3 illustrates a plan view of the noise damper 10. As illustrated in FIG. 3, the axial surface 12a is provided with a plurality of slits 15. Since the slits 15 can open or close by themselves so as to follow expansion deformation of the noise damper 10 based on freezing the moisture in the noise damper 10 in cold climates for example, cracks on the noise damper 10 can be prevented. Furthermore, even when a crack occurs on the noise damper 10, the slits 15 can make the crack inconspicuous. Therefore, the present invention can prevent deterioration in the appearance of the noise damper 10 by providing the slits 15.

In this embodiment, the slits 15 extend in a straight shape. The slits 15 may open or close themselves in the same direction over the whole length of the slits 15 to offer a large deformation thereof due to freezing. This makes it possible to further prevent cracks from occurring.

When the widths W1 of the slits 15 are too large, there is a possibility that effect to reduce road noise may not be obtained owing to a reduced volume of the noise damper 1. Preferably, the widths of the slits 15 are equal to or less than 2 mm. The slits 15 may be formed as a cut that has substantially no width in order to make cracks inconspicuous. However, the widths W1 of the slits 15 are preferably equal to or more than 0.5 mm in order to ensure opening/closing deformation of the slits smoothly based on freezing of moisture of the noise damper 10.

The slits 15 are preferably provided such that the slits 15 extend from axially both ends 10a and 10a of the noise damper 10 and have an axial length not less than 20% of the axial width Wa of the noise damper 10. That is, the noise damper 10 has small rigidity in axially both end portions as compared with an axially middle portion. Thus, there is high possibility that cracks occur on the axially both end portions of the noise damper 10. Accordingly, it would effectively obtain the effect preventing cracks by providing the slits 15 in the above mentioned manner. In this embodiment, the slits 15 are in communication with the both ends 10a and 10a of the noise damper 10.

Preferably, the slits 15 have a depth D1 (illustrated in FIG. 1) in a range of not more than 50% of the thickness (ta) of the noise damper 10. When the depth D1 of the slits 15 is more than 50% of the thickness (ta) of the noise damper 10, cracks or chipping may occur on the noise damper 10 owing to shortage of rigidity of the noise damper 10.

When the depth D1 of the slits 15 is too small, the effect to prevent cracks may be lower since the opening/closing deformation of the noise damper 10 becomes small during freezing the moisture in the noise damper 10. Thus, the depth D1 of the slits 15 is preferably in a range of from 2 to 5 mm.

When the circumferential pitches P1 of the slits 15 is more than 10 mm, the effect that prevents cracks when freezing and that makes cracks inconspicuous tends to be lower. When the circumferential pitches P1 of the slits 15 is less than 2 mm, cracks or chipping may occur on the noise damper 10 owing to shortage of rigidity of the noise damper 10. Preferably, the circumferential pitches P1 of the slits 15 is in a range of from 2 to 10 mm.

As the present embodiment, the noise damper 10 having an annular shape tends to have lower rigidity in the axial direction than the circumferential direction. Thus, there is high possibility that axially extending cracks occur in the noise damper 10. Accordingly, the slits 15 are preferably provided to have an angle θ1 of not more than 20 degrees with respect to the axial direction of the tire. In this embodiment, the slits 15 have the angle θ1 of zero degrees.

Figure 4:
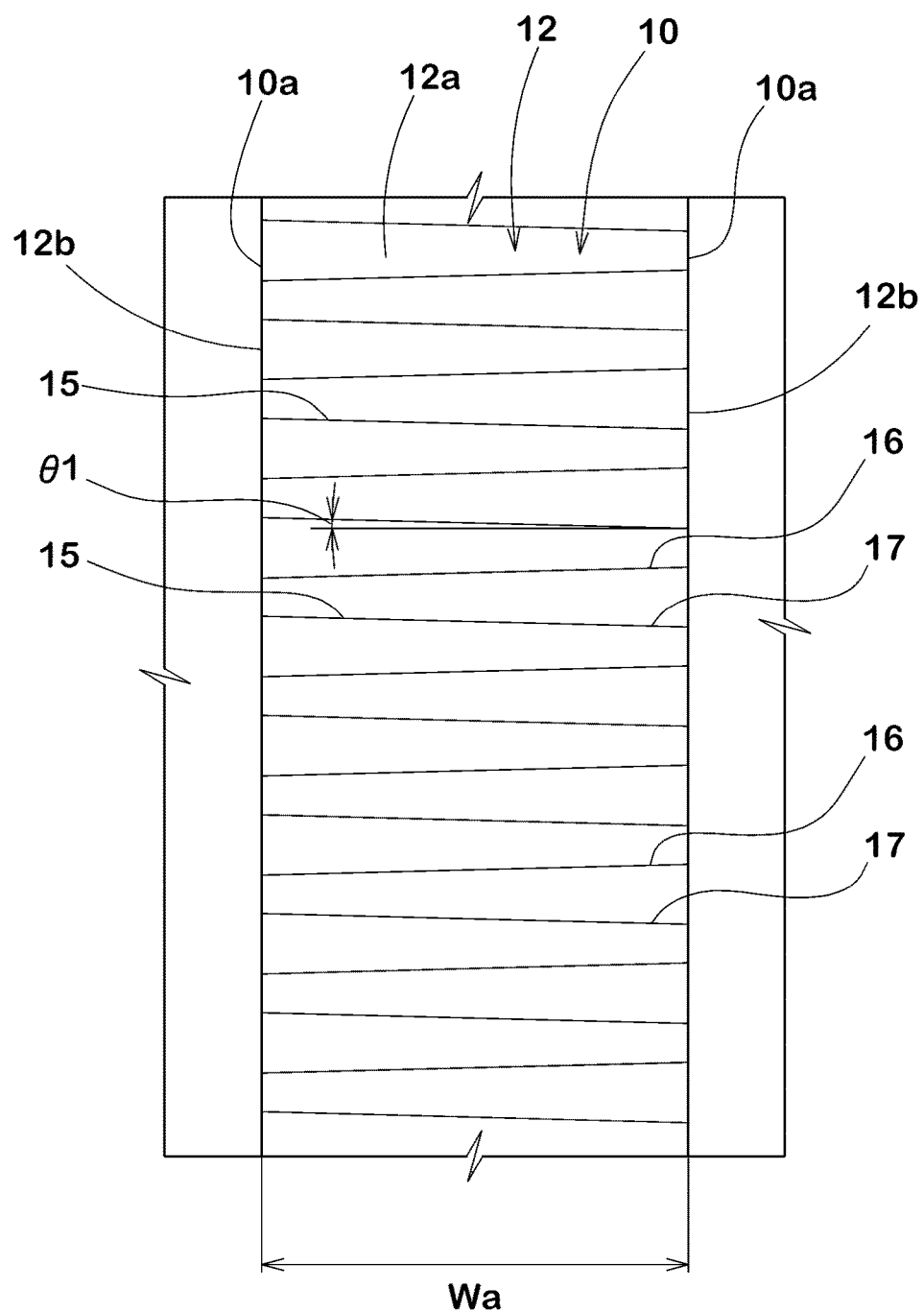
FIG. 4 is a plan view illustrating a noise damper in accordance with another embodiment.

FIG. 4 illustrates a plan view of the noise damper 10 in accordance with another embodiment. As illustrated in FIG. 4, the slits 15 provided on the exposed surface 12 of the noise damper 10 include first slits 16 and second slits 17 extending in a direction intersecting with the first slits 16. Such a slit can follow expansion deformation of the noise damper 10 in various directions occurring when freezing, and can further prevent cracks from the noise damper 10. In this embodiment, the first slits 16 and the second slits 17 are arranged alternately in the circumferential direction of the tire. Note that the present invention is not limited to the present embodiment. Alternatively, the slits 15 may be arranged so that a group having a plurality of circumferentially successive first slits 16 and another group having a plurality of circumferentially successive second slits 17 are arranged alternately in the circumferential direction of the tire.

Figure 5:
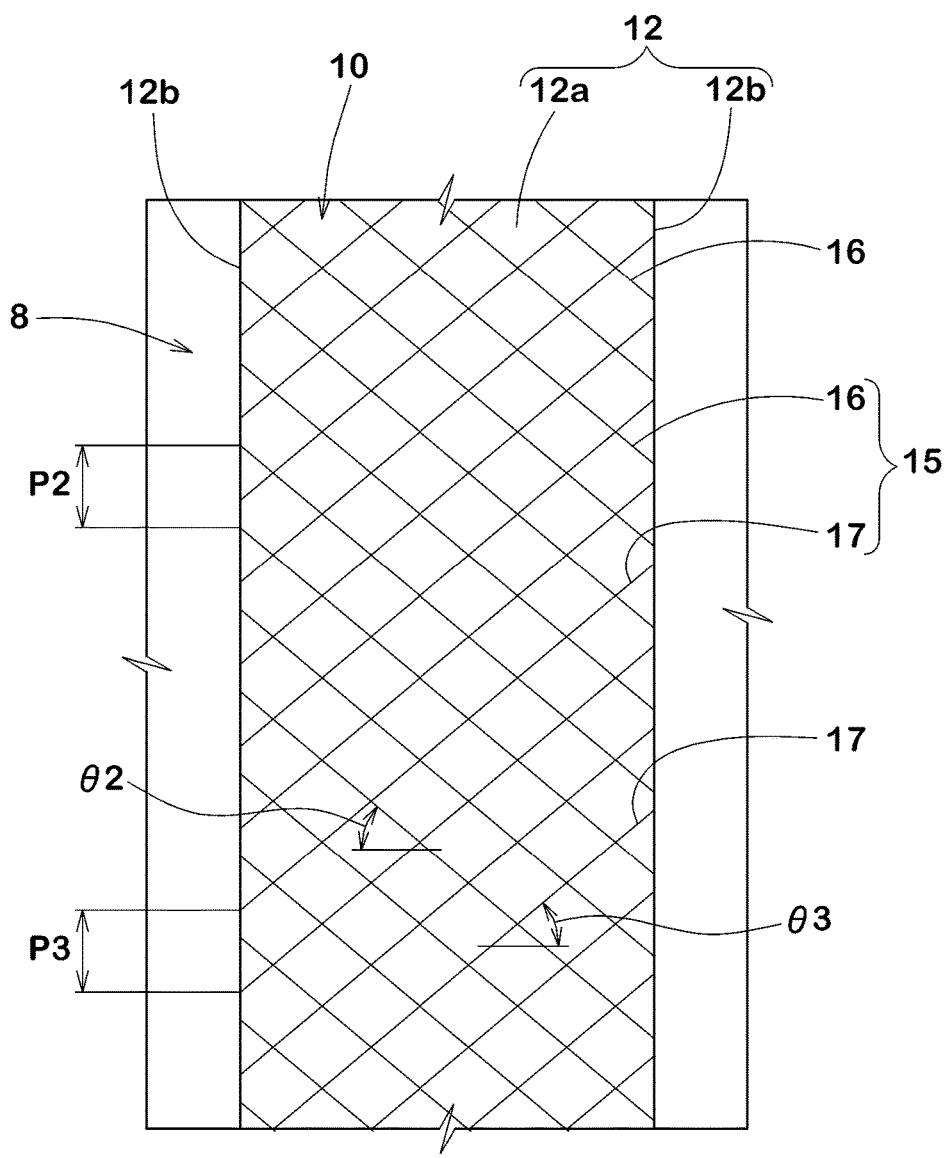
FIG. 5 is a plan view illustrating a noise damper in accordance with yet another embodiment.

FIG. 5 illustrates a plan view of the noise damper 10 in accordance with yet another embodiment. As illustrated in FIG. 5, the exposed surface 12 is provided with the first slits 16 and the second slits 17 which intersect with each other. In the slits 15 according to the present embodiment, one first slit 16 and one second slits 17 adjacent the first slit 16 can open or close themselves to follow the expansion deformation of the noise damper 10 so as to further prevent cracks of the noise damper 10 from occurring.

The absolute value of the difference |θ2−θ3| between an angle θ2 of the first slits 16 relative to the axial direction of the tire and an angle θ3 of the second slits 17 relative to the axial direction of the tire is preferably not more than 10 degrees, more preferably not more than 5 degrees. Thus, the first slits 16 and the second slits 17 can open and close themselves in the circumferential direction of the tire in good balance when the expansion deformation is caused by freezing of the water in the noise damper 10. In particular, this embodiment can prevent an axially extending crack from occurring. Accordingly, deterioration in appearance of the noise damper 10 can be suppressed.

In order to open the first slits 16 or the second slit 17 in the circumferential direction more widely, the angles θ2 and θ3 relative to the axial direction of the first slits 16 and the second slits 17 respectively are preferably not more than 45 degrees, more preferably not more than 20 degrees.

In order to further improve the effects as described above, circumferential pitches P2 of the first slits 16 are preferably equal to circumferential pitches of the second slit 17. Preferably, the pitches P2 of the first slits 16 are in a range of from 2 to 10 mm. Preferably, the first slits 16 and the second slits 17 have a depth in a range of not more than 50% of the thickness (ta) in the radial direction of the noise damper 10, more preferably in a range of from 2 to 5 mm.

While a particularly preferred embodiments of the present invention have been described in detail, the present invention is not be limited to the embodiments as shown, but it may be carried out by modifying to various aspects.

Example

Passenger car tires 215/45R17 having a basic structure as illustrated in FIG. 1 and FIG. 2 were manufactured based on details shown in Table 1, and were tested. Major common specifications of each test tire and test methods are as follows:

Noise damper width Wa: 100 mm
Noise damper thickness ta: 30 mm
Noise damper: ether-based polyurethane sponge (ESH2 manufactured by INOAC CORPORATION)

First slit and second slit depths: 5 mm
First slit pitches P2 and second slit pitches P3: 5 mm
Note that Ref. 1 and Ref. 2 have no slits.
<Anti-Cracking Performance>
Each test tire was run on a drum test machine with a diameter of 1.7 m under the following conditions. Then, developmental state of cracks of the noise damper was confirmed after the rim had been removed. The results are indicated in five-point method with scored, regarding crack generation state, by the evaluation methods described below. The larger the value, the better the performance is. Note that each test tire with a noise damper moistened with 50 cc of water was left in a freezer at −30 degrees C. for twelve hours prior to the test.
Rim: 17×7.0JJ
Internal pressure: 220 kPa
Tire load: 4.2 kN
Speed: 60 km/h
Running time: 5 minutes
<Evaluation Method for Crack Generation State>
1: Crack with over 50 mm length occurred.
2: No cracks with over 50 mm length, but five or more cracks occurred.
3: No cracks with over 50 mm length, but one to four crack(s) occurred.
4: Crack symptoms exist.
5: No crack symptoms exist.
<Appearance Performance>
After the above mentioned test, appearance of each noise damper of each test tire was checked. The results are indicated using a score based on appearance of the exposed surface, wherein Ex. 1 is set to five points. The larger the value, the better the performance is.

The invention claimed is:

1. A pneumatic tire with a noise damper comprising:
a pneumatic tire having a tread portion;
a circumferentially extending noise damper made of a spongy material and being fixed to a surface on a side of a tire cavity of the tread portion; and
the noise damper having an exposed surface facing the tire cavity, the exposed surface being provided with a plurality of slits,
wherein the slits have widths equal to or less than 2 mm, and
wherein the slits comprise a first slit, and a second slit extending in a direction intersecting the first slit.

2. The pneumatic with a noise damper according to claim 1,
wherein the slits have a depth in a range of less than 50% of a thickness of the noise damper.

3. The pneumatic with a noise damper according to claim 2,
wherein the depth is in a range of from 2 to 5 mm.

4. The pneumatic with a noise damper according to claim 1,
wherein the slits are arranged at pitches of from 2 to 10 mm in a circumferential direction of the tire.

5. The pneumatic with a noise damper according to claim 1,
wherein the slits are inclined at an angle of less than 20 degrees with respect to an axial direction of the tire.

6. The pneumatic with a noise damper according to claim 1,
wherein the first slit and the second slit intersect with one another.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Figure illustrating slit shape | — | FIG. 3 | FIG. 3 | FIG. 3 | FIG. 3 | FIG. 3 | FIG. 3 | FIG. 3 | FIG. 3 | FIG. 3 | FIG. 3 |
| Slit depth (mm) | — | 5 | 1 | 2 | 10 | 25 | 5 | 5 | 5 | 5 | 5 |
| Slit pitches P1 (mm) | — | 2 | 2 | 2 | 2 | 2 | 1 | 10 | 15 | 2 | 2 |
| Slit angle $\theta_1$ (deg.) | — | 0 | 0 | 0 | 0 | 0 | 0 | 0 | 0 | 20 | 25 |
| Crack generating state [five point method: larger is better] | 1 | 4 | 3 | 4 | 4 | 4 | 4 | 4 | 4 | 4 | 3 |
| Appearance [Score: larger is better] | 2 | 5 | 4 | 5 | 5 | 4 | 4 | 5 | 4 | 4 | 3 |

|  | Ref. 2 | Ex. 11 | Ex. 12 | Ex. 13 | Ex. 14 | Ex. 15 | Ex. 16 | Ex. 17 |
|---|---|---|---|---|---|---|---|---|
| Figure illustrating slit shape | — | FIG. 5 | FIG. 5 | FIG. 5 | FIG. 5 | FIG. 5 | FIG. 5 | FIG. 5 |
| First slit angle $\theta_2$ (deg.) | — | 45 | 45 | 45 | 45 | 20 | 20 | 20 |
| Second slit angle $\theta_3$ (deg.) | — | 45 | 35 | 30 | 55 | 20 | 10 | 30 |
| Crack generating state [five point method: larger is better] | 1 | 4 | 4 | 3 | 3 | 4 | 4 | 3 |
| Appearance [Score: larger is better] | 1 | 5 | 4 | 3 | 4 | 4 | 4 | 4 |

From the test results, it was confirmed that the example tires suppress deterioration in appearance of the noise damper as compared with the reference tires.

REFERENCE SIGNS LIST

1 Pneumatic tire
2 Tread portion
2b Surface of tread portion on tire cavity side
10 Noise damper
12 Exposed surface
15 Slit
N Tire cavity 7. The pneumatic with a noise damper according to claim 1, wherein the exposed surface comprises a pair of axially spaced side surfaces, and both ends of each of the first slit and the second slit are communicated with the respective side surfaces.

8. The pneumatic with a noise damper according to claim 7, wherein the first slit and the second slit are inclined at angles $\theta_2$ and $\theta_3$, respectively, and the angles $\theta_2$ and $\theta_3$ are equal to or less than 45 degrees with respect to an axial direction of the tire.

9. The pneumatic with a noise damper according to claim 8, wherein the difference between the angle θ2 of the first slit and the angle θ3 of the second slit is not more than 10 degrees.

10. A belt-shaped sponge noise damper for a tire to be fixed to a surface on a side of a tire cavity of a tread portion of a pneumatic tire along a circumferential direction, the noise damper comprising:
   a mounting surface for the tread portion and an exposed surface located in an opposite side of the mounting surface; and
   the exposed surface being provided with a plurality of slits,
   wherein the slits have widths equal to or less than 2 mm,
   wherein the slits comprise a first slit, and a second slit extending in a direction intersecting the first slit;
   wherein the slits have a depth in a range of less than 50% of a thickness of the noise damper; and
   wherein the depth is in a range of from 2 to 5 mm.

11. The noise damper for a tire according to claim 10, wherein the slits are arranged at pitches of from 2 to 10 mm in a circumferential direction of the tire.

12. The noise damper for a tire according to claim 10, wherein the slits are inclined at an angle of less than 20 degrees with respect to an axial direction of the tire.

13. The noise damper for a tire according to claim 10, wherein the first slit and the second slit intersect with one another.

14. The noise damper according to claim 10, wherein the exposed surface comprises a pair of spaced side surfaces, and both ends of each of the first slit and the second slit are communicated with the respective side surfaces.

15. The noise damper for a tire according to claim 14, wherein the first slit and the second slit are inclined at angles θ2 and θ3, respectively, and the angles θ2 and θ3 are equal to or less than 45 degrees with respect to an axial direction of the tire.

16. The noise damper for a tire according to claim 15, wherein the difference between the angle θ2 of the first slit and the angle θ3 of the second slit is not more than 10 degrees.

\* \* \* \* \*